United States Patent [19]
Kashimura et al.

[11] Patent Number: 5,753,826
[45] Date of Patent: *May 19, 1998

[54] FLOW METER HAVING A VIBRATION DAMPENER

[75] Inventors: Osamu Kashimura; Etsuro Ito; Michihiko Tsuruoka, all of Kanagawa, Japan

[73] Assignee: Fuji Electric Co., Ltd., Kanagawa, Japan

[*] Notice: The term of this patent shall not extend beyond the expiration date of Pat. No. 5,563,350.

[21] Appl. No.: 697,416

[22] Filed: Aug. 23, 1996

Related U.S. Application Data

[63] Continuation-in-part of Ser. No. 263,339, Jun. 21, 1994, Pat. No. 5,563,350.

[30] Foreign Application Priority Data

Jun. 22, 1993 [JP] Japan ................... 5-149644

[51] Int. Cl.⁶ ........................................ G01F 1/32
[52] U.S. Cl. ............................... 73/861.22; 285/49
[58] Field of Search ................... 73/861.22, 861.18, 73/861.21; 285/49, 403, 404

[56] References Cited

U.S. PATENT DOCUMENTS

| | | | |
|---|---|---|---|
| 3,372,948 | 3/1968 | Arneson | 285/98 |
| 4,364,276 | 12/1982 | Shimazoe et al. | 73/721 |
| 4,414,851 | 11/1983 | Maglic | 73/706 |
| 4,438,954 | 3/1984 | Hattori | 285/104 |
| 4,790,821 | 12/1988 | Stines | 73/706 |

FOREIGN PATENT DOCUMENTS 4-256811  9/1992  Japan.

Primary Examiner—George M. Dombroske
Assistant Examiner—Harshad Patel
Attorney, Agent, or Firm—Finnegan, Henderson, Farabow, Garrett & Dunner, L.L.P.

[57] ABSTRACT

The invention concerns a Karman's vortex flow meter including dampening members for absorbing vibrations. A stopper is provided to permit limited movement between an amplifier casing and a supporting stand containing a flow detector. The stopper is coupled to one of the supporting stand and the casing and extends into a hole in the other of the supporting stand and the casing. The flow meter includes an elastic member positioned in the hole between the stopper and the other of the supporting stand and the casing so that the stopper and the other of the supporting stand and the casing are out of direct contact. The elastic member absorbs vibrations and prevents direct contact of the components to ensure accurate flow measurement.

15 Claims, 5 Drawing Sheets

5,753,826

1

FLOW METER HAVING A VIBRATION DAMPENER

This application is a continuation in part of U.S. patent application Ser. No. 08/263,339, filed on Jun. 21, 1994, now U.S. Pat. No. 5,563,350.

BACKGROUND OF THE INVENTION

1. Field of the Invention

The present invention relates to a flow meter including structure for limiting axial movement between a casing and supporting stand. More particularly, the present invention relates to a Karman's vortex flow meter having a vibration dampener for improving flow measurement accuracy.

2. Description of Related Art

FIG. 7 illustrates the structure of a conventional Karman's vortex flow meter. As shown in this figure, the Karman's vortex flow meter includes a vortex generator 2 extending diametrically across the interior of a pipeline 1 for flowing fluid. The vortex generator 2 has a columnar member provided at its upstream side (facing the left side of FIG. 7) and another columnar member provided at its downstream side (facing the right side of FIG. 7). To seal fluid in the pipeline 1 and prevent vibration at the junction between the vortex generator 2 and the pipeline 1, O-rings 5 and 6 are fit between the vortex generator 2 and pipeline 1 adjacent to opposite ends of the vortex generator 2.

The Karman's vortex flow meter also includes a detecting bar 3 having a disk-shaped diaphragm 3a, a lower bar portion 3b, and an upper bar portion 3c. The diaphragm 3a contacts an O-ring 24 positioned on an upper portion of the vortex generator 2. The lower bar portion 3b has a diameter smaller than that of the remainder of the detecting bar 3 and extends from the diaphragm 3a, through a vibration reducing and sealing O-ring 4, and into a cavity formed in the downstream columnar member of the vortex generator 2. The upper bar portion 3c extends from the diaphragm 3b and includes exterior threads (not shown).

A piezo-electric element 7, insulating plate 8, and disk spring 9 are mounted successively on the threads of the upper bar portion 3c of the detecting bar 3. A balance weight 10 coupled to the upper bar portion 3c secures the piezo-electric element 7, insulating plate 8, and disk spring 9 in place. In addition, the balance weight 10 reduces the effects of external vibrations, such as vibrations of the pipeline 1.

As shown in FIG. 7, the Karman's vortex flow meter also includes a supporting stand 22 having a flange 22a and a hollow cylinder 22b extending from the flange 22a. The hollow cylinder 22b houses a detecting section of the Karman's flow meter including the diaphragm 3a and piezo-electric element 7. Bolts 11 fixedly mount the flange 22a and hollow cylinder 22b to the pipeline 1 so that the flange 22a secures the vortex generator 2 in the pipeline 1.

In use, fluid flowing in the pipeline 1 displaces the lower bar portion 3b and this displacement is transmitted to the diaphragm 3a of the detecting bar 3. The piezo-electric element 7 then outputs an electrical signal when it detects even a slight displacement of the diaphragm 3a.

The conventional Karman's vortex flow meter also includes an amplifier casing assembly having a casing 13 and two covers 14 threadably secured to the casing 13 and sealed with O-rings 16. The amplifier casing assembly contains a signal amplifier 18, including a printed circuit board and other elements, for determining fluid flow rate in pipeline 1 based on the electrical signal output from the

2 piezo-electric element 7. An O-ring 15 seals a lower end portion of the casing 13 and an upper end portion of the hollow cylinder 22b of the supporting stand 22, and bolts 19 threaded in the casing 13 and hollow cylinder 22b secure the casing 13 to the hollow cylinder 22b. The O-ring 15 sealingly isolates the detecting section and detecting circuitry from the exterior of the flow meter.

One disadvantage of the above-described conventional Karman's vortex flow meter is that it is affected by external vibrations caused by noise transmitted through the pipeline 1 or impacts with the amplifier casing 13. For example, when an external vibration resonates the amplifier casing 13, this vibration is transmitted by the supporting stand 22 to the detecting section including the piezo-electric element 7, thus affecting the output of the element 7. If the pipeline 1 or amplifier casing 13 vibrate enough to oscillate the Karman's vortex flow meter when the flow rate is low, accuracy of flow rate measurement can be significantly reduced.

In light of the foregoing, there is a need in the art for a flow meter capable of dampening vibrations.

SUMMARY OF THE INVENTION

Accordingly, the present invention is directed to a flow meter capable of reducing the drawbacks associated with the conventional Karman's vortex flow meter. More specifically, an object of the invention is to provide a stable output signal by reducing the likelihood that vibrations, external noises, and impacts will adversely affect flow measurement.

An additional object of the invention is to isolate a stopper from a hollow cylinder of a supporting stand or from a casing.

To achieve these and other advantages and in accordance with the purpose of the invention, as embodied and broadly described herein, the invention includes a Karman's vortex flow meter comprising a supporting stand mounted on a pipe line, said supporting stand including a hollow cylinder having a flow meter detecting section therein, first vibration damping elements fitted in annular grooves formed on an outer surface of said hollow cylinder of said supporting stand, a casing fitted on said hollow cylinder of said supporting stand with said first vibration damping elements positioned therebetween, said casing having a flow meter amplifier disposed therein, a stopper provided between said supporting stand and said casing, said stopper permitting limited axial movement of said casing with respect to said hollow cylinder of said supporting stand and being inserted into a recess formed on an outer surface of said hollow cylinder of said supporting stand so that a gap is formed between said stopper and said hollow cylinder, and a second vibration damping element disposed in said gap between said recess of said supporting stand and said stopper.

In another aspect, the invention includes elastic means for floatingly mounting a casing onto a hollow cylinder of a supporting stand with said casing out of direct contact with said hollow cylinder, and displacement limiting means for permitting limited displacement of said casing relative to said hollow cylinder, said displacement limiting means including a stopper fixed to one of said casing and said hollow cylinder of said supporting stand, and an elastic member interposed between said stopper and the other of said casing and said hollow cylinder of said supporting stand.

In a further aspect, the invention includes a flow meter having a stopper for permitting limited axial movement between a casing and a supporting stand, the stopper being coupled to one of the supporting stand and the casing and extending into a hole in the other of the supporting stand and the casing, and an elastic member positioned in the hole between the stopper and the other of the supporting stand and the casing so that the stopper and the other of the supporting stand and the casing are out of direct contact.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENTS

Figure 1:
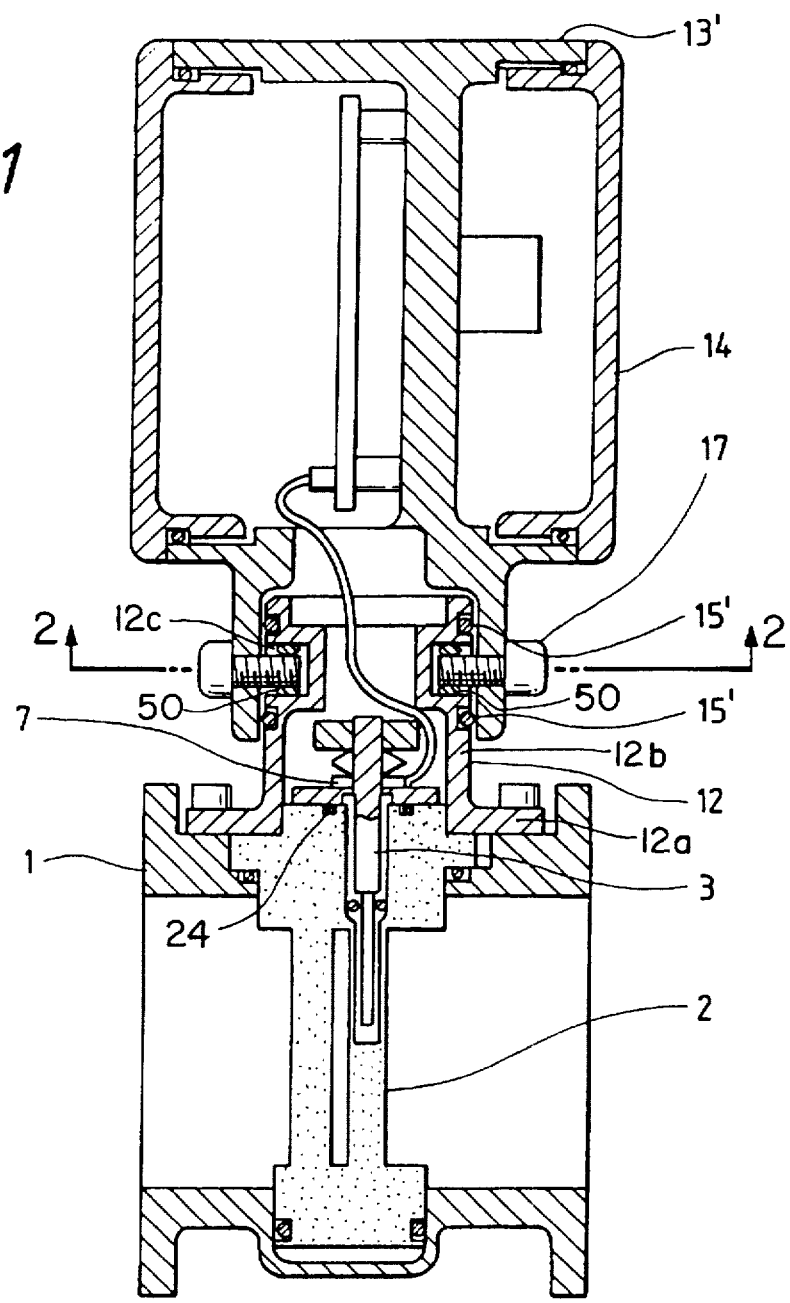
FIG. 1 is a cross-sectional side view of a first embodiment of the Karman's flow meter of the invention.

Reference will now be made in detail to the present preferred embodiments of the invention, examples of which are illustrated in the accompanying drawings. In the drawings, like reference numeral are used to identify like or identical elements.

Figure 2:
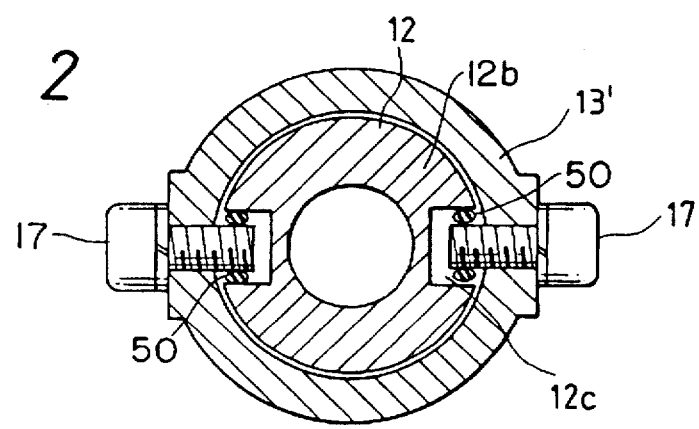
FIG. 2 is a cross-sectional view taken along line 2—2 of FIG. 1.

FIGS. 1 and 2 show a first embodiment of the Karman's vortex flow meter. As shown in FIG. 1, the first embodiment includes a supporting stand 12 having a flange 12a and a hollow cylinder 12b extending from the flange 12a. A detecting section including a piezo-electric element 7 is positioned in the hollow cylinder 12b. O-rings 15' are fit in two annular grooves formed in an outer surface of the hollow cylinder 12b, and a pair of opposed blind holes or recesses 12c are formed in the outer surface of the hollow cylinder 12b between the O-rings 15'.

The O-rings 15' frictionally fit a lower cylindrical shaped end of an amplifier casing 13' on the hollow cylinder 12b of the supporting stand 12. As shown in FIGS. 1 and 2, the O-rings 15' form an annular clearance between the lower end of the casing 13' and the hollow cylinder 12b so that the casing 13' and the supporting stand 12 do not contact one another. The O-rings 15' dampen and absorb vibrations occurring, for example, when the casing 13' of the amplifier resonates. Because the vibrations are dampened and absorbed rather than being transmitted directly to a detecting section in the hollow cylinder 12b, flow rate measurement is very accurate.

Axial movement of the casing 13' with respect to the supporting stand 12 is limited by stoppers 17. As shown in FIGS. 1 and 2, the stoppers 17 are shaped like bolts and have an external thread portion threaded in holes in the lower end portion of the casing 13'. The stoppers 17 have heads seated against an outer surface of the casing 13' and end portions extending into the blind holes 12c formed in the hollow cylinder 12b. Because the portions of the stoppers 17 extending into the blind holes 12c are smaller and shorter than the blind holes 12c, a gap forms between each corresponding stopper 17 and blind hole 12c.

As shown in FIGS. 1 and 2, elastic vibration dampening members or elements 50 are positioned in the blind holes 12c in the gaps formed between the stoppers 17 and the blind holes 12c. In this embodiment, the elastic elements 50 are thin, hollow, cylindrically shaped, and frictionally fitted on the end portions of the stoppers 17. The elastic elements 50 are slightly deformable to allow for limited movement of the stoppers 17 within the blind holes 12c and corresponding limited movement of the casing 13' with respect to the supporting stand 12.

Similar to the O-rings 15', the elastic elements 50 absorb vibrations to ensure that flow measurement will be accurate. In addition, the elastic elements 50 prevent or significantly limit direct contact between the stoppers 17 and the hollow cylinder 12b to reduce vibrational transmission. This vibrational absorption and reduction of vibration transmission maintains the accuracy of the Karman' vortex flow meter even when the casing 13' or another structural element vibrates.

Figure 3:
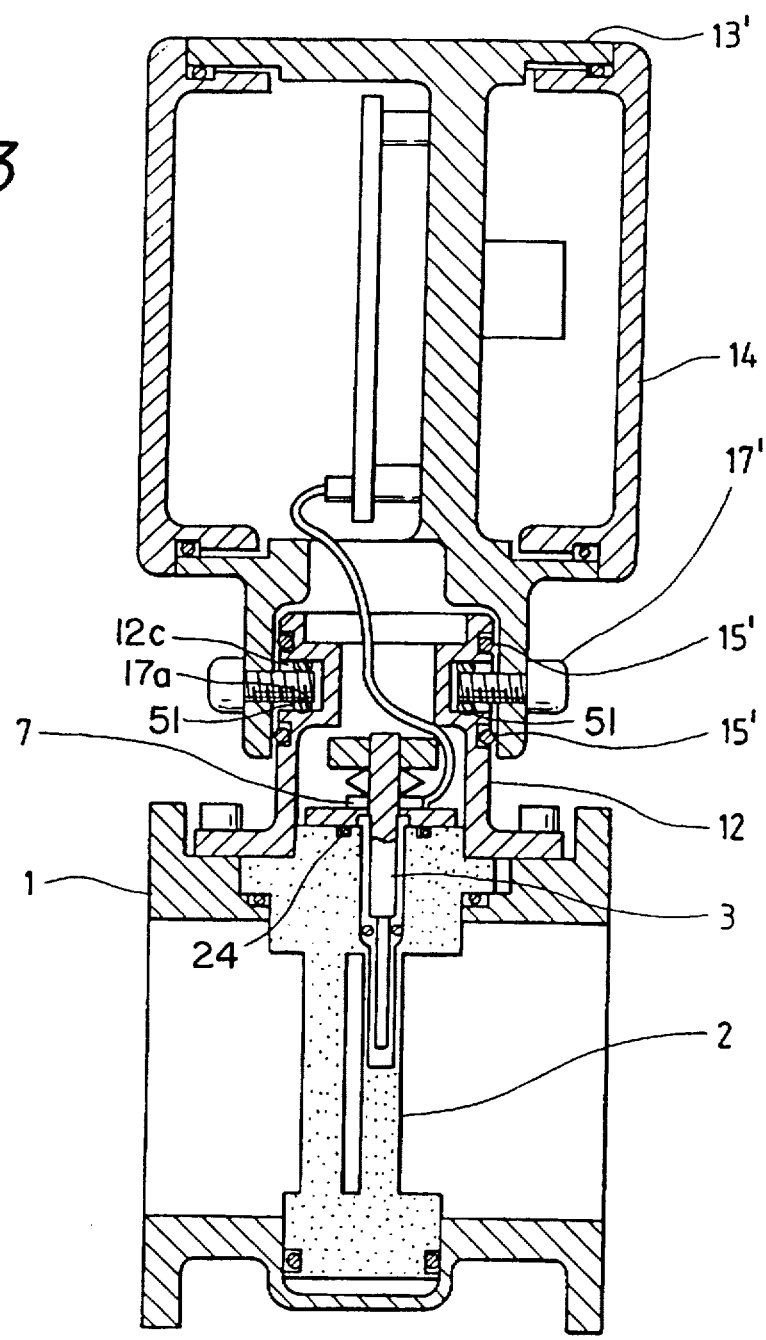
FIG. 3 is a cross-sectional side view similar to FIG. 1 of a second embodiment of the Karman's flow meter of the invention.

FIG. 3 shows another embodiment of the Karman's vortex flow meter of the present invention. This embodiment includes stoppers 17', similar to the stoppers 17 described in connection with FIG. 1. As shown in FIG. 3, the stoppers 17' include annular grooves 17a in an end portion of the stoppers 17'. An elastic O-ring 51 is fit in each of the annular grooves 17a. The elastic O-rings 51 function like elastic elements 50 described in connection with FIG. 1 to limit movement, absorb vibrations, and reduce vibrational transmission.

Figure 4:
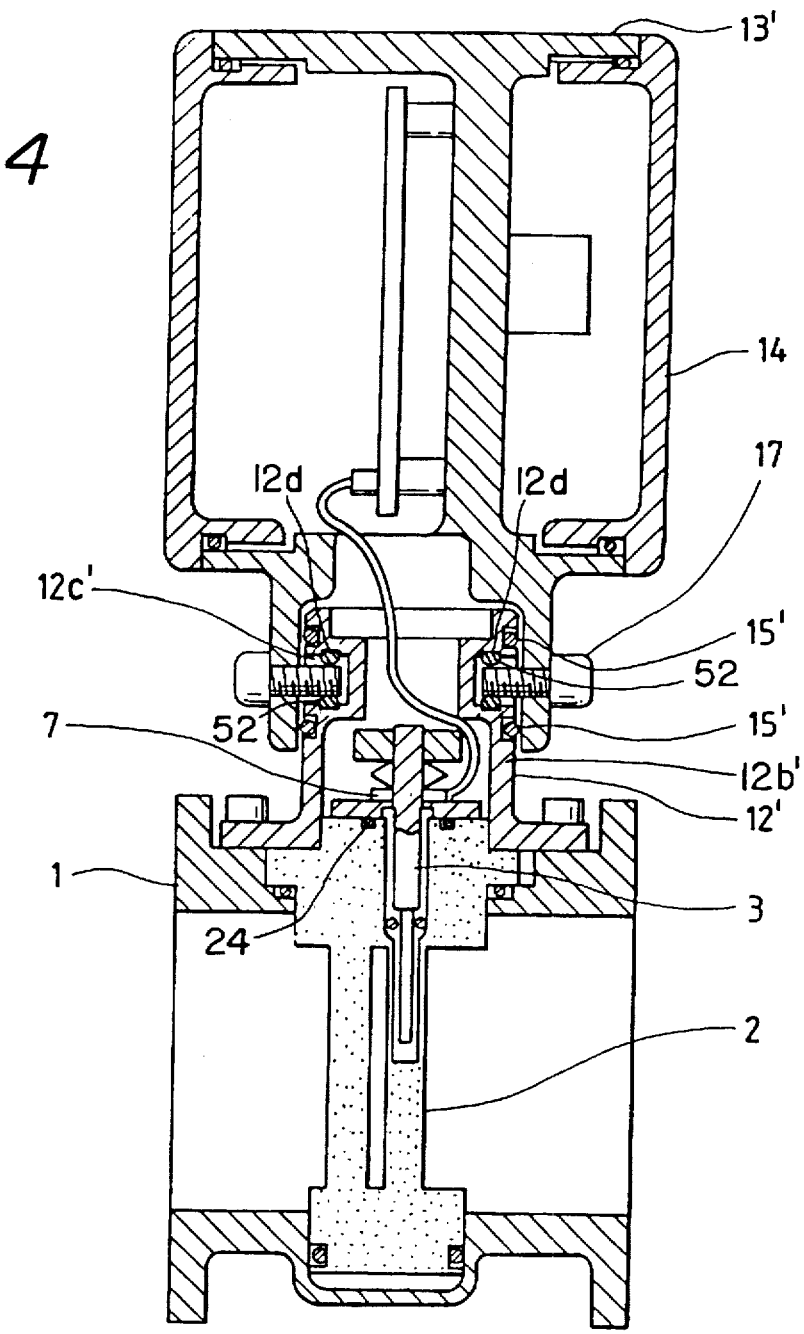
FIG. 4 is a cross-sectional side view similar to FIG. 1 of a third embodiment of the Karman's flow meter of the invention.

In FIG. 4, another embodiment of the Karman's vortex flow meter is shown. This embodiment includes a supporting stand 12' having a hollow cylinder 12b' and blind holes 12c', similar to the supporting stand 12, hollow cylinder 12b, and blind holes 12c described in connection with the embodiment of FIG. 1.

As shown in FIG. 4, annular grooves 12d are formed in the portions of the hollow cylinder 12b' forming the blind holes 12c'. An elastic O-ring 52 is fit in each of the grooves 12d. The elastic O-rings 52 also function like the elastic elements 50 shown in FIGS. 1 and 2 to limit movement, absorb vibrations, and reduce vibrational transmissions.

Figure 5:
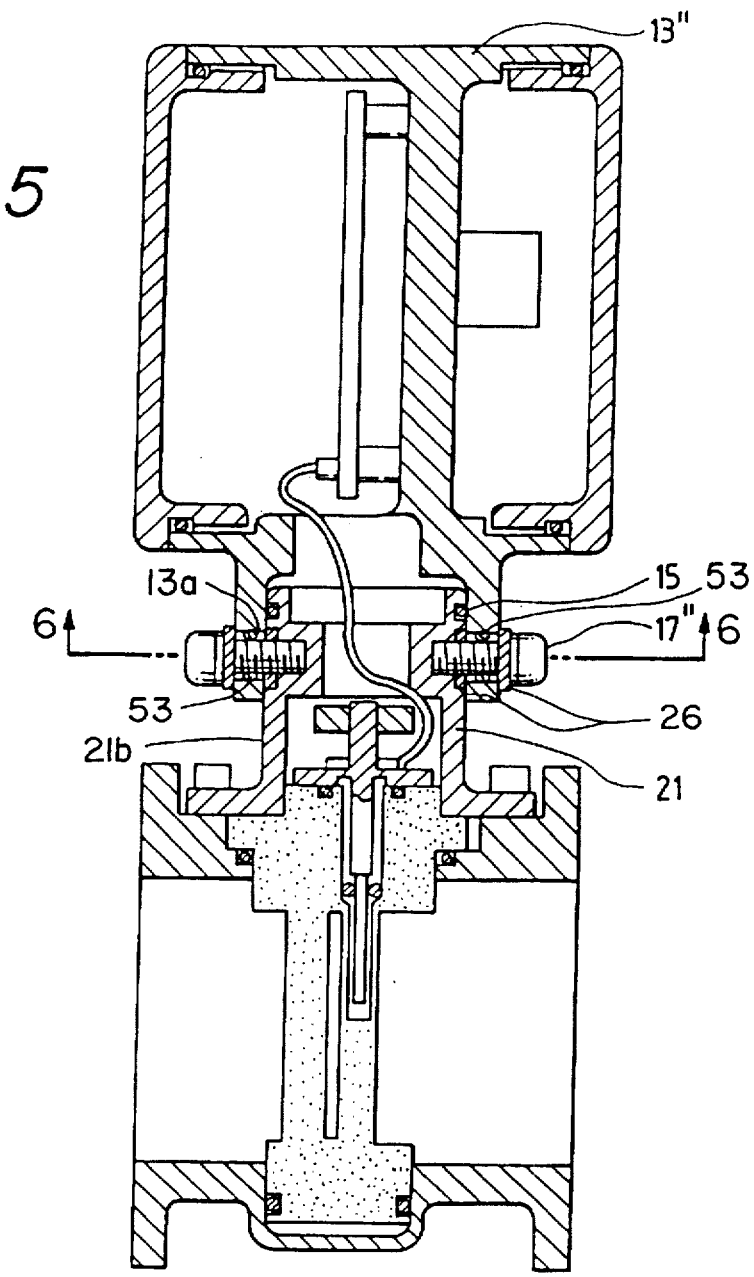
FIG. 5 is a cross-sectional side view similar to FIG. 1 of a fourth embodiment of the Karman's flow meter of the invention.
Figure 6:
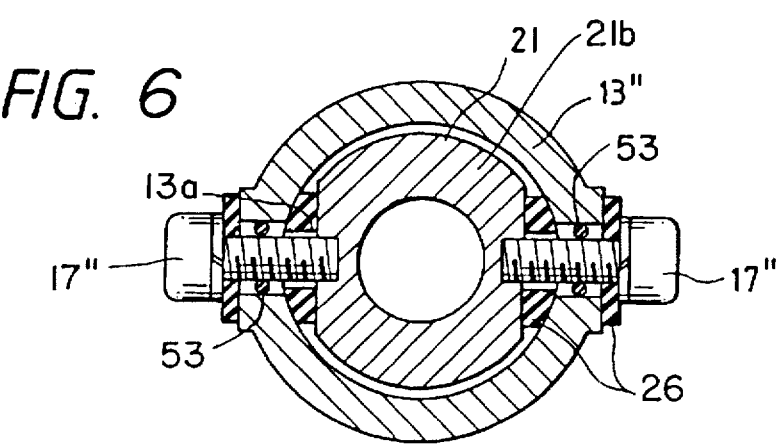
FIG. 6 is a cross-sectional view taken along line 6—6 of FIG. 5.
Figure 7:
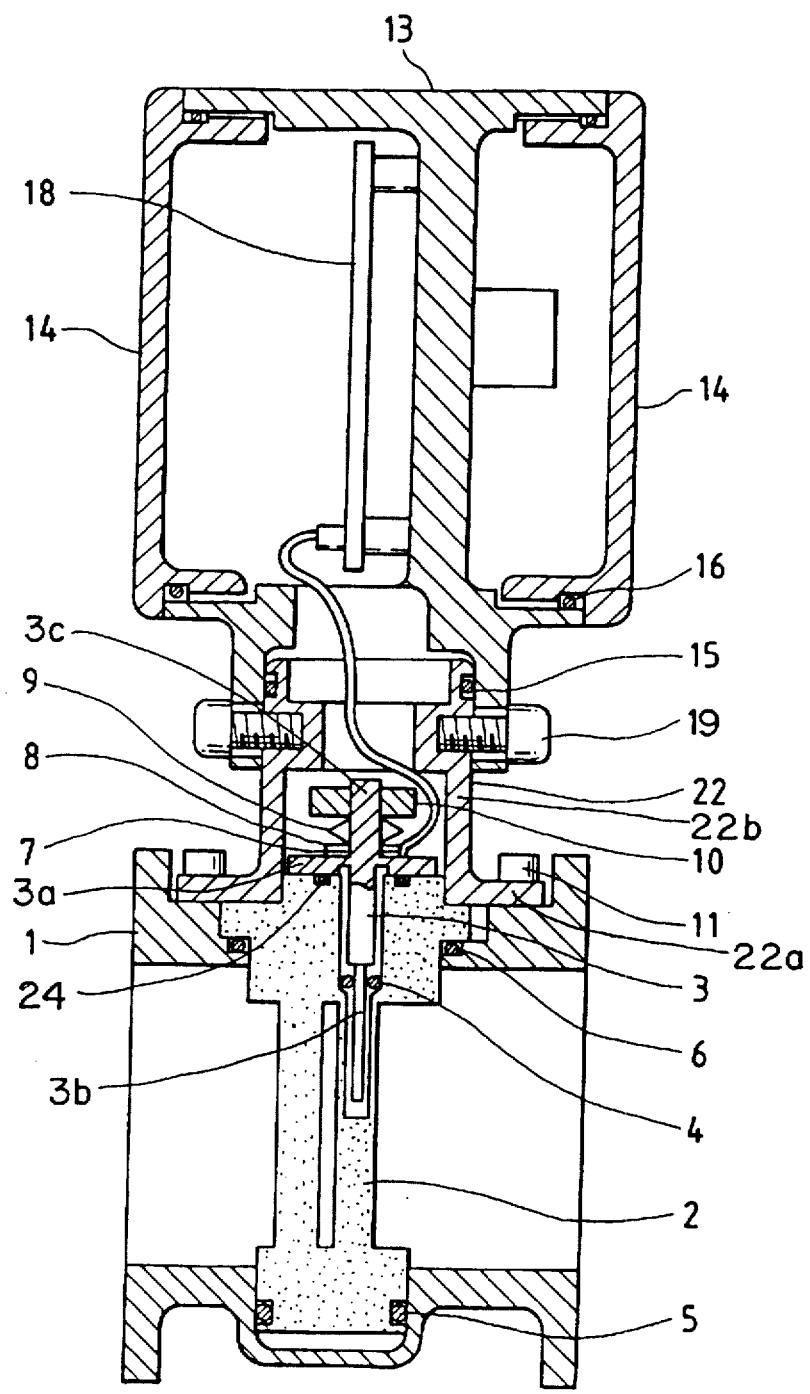
FIG. 7 is a sectional side view of a conventional Karman's vortex flow meter.

FIGS. 5 and 6 show another embodiment of the Karman's vortex flow meter. As shown in FIG. 5, a lower cylindrical shaped end of an amplifier casing 13" is positioned on a hollow cylinder 21b of a supporting stand 21. Stoppers 17" extend through holes 13a passing through the casing 13" and are threaded into the hollow cylinder 21b.

As shown in FIGS. 5 and 6, annular dampening members 26 made of elastic rubber are arranged on inner and outer surfaces of the lower cylindrical end of the casing 13" so that openings in the dampening members 26 are aligned with the holes 1 3a. The dampening members 26 are positioned between the hollow cylinder 21b and the casing 13" and between heads of the stoppers 17" and the casing 13". The dampening members 26 place the hollow cylinder 21b and casing 13" out of direct contact with one another to reduce the likelihood of vibrational transfer to a detecting section in the hollow cylinder 21b. In addition, the dampening members 26 absorb and dampen vibrations.

The holes 13a in casing 13" have an inner diameter larger the outer diameter of the portion of the stoppers 17" passing through the holes 13a. This causes a gap to form in the holes 13a between the stoppers 17" and the casing 13". To limit movement of the casing 13" with respect to the supporting stand 21 and to absorb vibrations, elastic members 53, such as elastic cylinders or O-rings, are positioned in holes 13a in the gaps formed between the stoppers 17" and casing 13".

The combination of both the dampening members 26 and the elastic members 53 dampen vibrations to ensure accurate fluid flow measurement. The elastic members 53 are preferably deformable to allow for limited movement of the stoppers 17" in the holes 13a and corresponding limited movement of the casing 13" with respect to the hollow cylinder 21b.

As shown in the embodiments of FIGS. 1–6, longitudinal axes of the stoppers 17, 17', 17" are preferably in the same plane as the path of fluid flow in the pipeline 1. This arrangement allows the casing 13', 13" to pivot slightly about the stoppers 17, 17', 17" or move with respect to the casing 13', 13" when an object traveling perpendicular to the flow path contacts the casing 13', 13". However, other arrangements are possible.

For example, the above-mentioned embodiments of the invention have particular advantages when the casing 13', 13" is mounted on the supporting stand 12, 12', 21 so that longitudinal axes of the stoppers 17, 17', 17" are in a plane perpendicular to the path of fluid flow in the pipeline 1. The elastic members 50–53 allow for this type of mounting because they ensure that the stoppers 17, 17', 17" will not contact the hollow cylinder 12b, 12b', 21b or casing 13', 13" when an object hits the casing 13', 13".

It will be apparent to those skilled in the art that various modifications and variations can be made to the structure of the present invention without departing from the scope or spirit of the invention. For example, the invention could be practiced with various other types of flow meters other than a Karman's vortex flow meter. In view of the foregoing, it is intended that the present invention cover modifications and variations of this invention provided they fall within the scope of the following claims and their equivalents.

What is claimed is:

1. A Karman's vortex flow meter comprising:
  a supporting stand mounted on a pipe line, said supporting stand including a hollow cylinder having a flow meter detecting section therein;
  first vibration damping elements fitted in annular grooves formed on an outer surface of said hollow cylinder of said supporting stand;
  a casing fitted on said hollow cylinder of said supporting stand with said first vibration damping elements positioned therebetween, said casing having a flow meter amplifier disposed therein;
  a stopper provided between said supporting stand and said casing, said stopper permitting limited axial movement of said casing with respect to said hollow cylinder of said supporting stand and being inserted into a recess formed on an outer surface of said hollow cylinder of said supporting stand so that a gap is formed between said stopper and said hollow cylinder; and
  a second vibration damping element disposed in said gap between said recess of said supporting stand and said stopper.

2. A Karman's vortex flow meter according to claim 1, wherein said second vibration damping element includes a thin hollow cylindrical elastic member fitted on an end portion of said stopper.

3. A Karman's vortex flow meter according to claim 1, wherein said second vibration damping element includes an O-ring received in an annular groove formed on an end portion of said stopper.

4. A Karman's vortex flow meter according to claim 1, wherein said second vibration damping element includes an O-ring received in an annular groove formed on a peripheral surface of said recess of said supporting stand.

5. A Karman's vortex flow meter comprising:
  a supporting stand mounted on a pipe line, said supporting stand including a hollow cylinder having a flow meter detecting section therein;
  a casing for containing therein an amplifier to amplify a signal from said detecting section;
  elastic means for floatingly mounting said casing onto said hollow cylinder of said supporting stand with said casing out of direct contact with said hollow cylinder; and
  displacement limiting means for permitting limited displacement of said casing relative to said hollow cylinder, said displacement limiting means including:
    a stopper coupled to one of said casing and said hollow cylinder of said supporting stand, and
    an elastic member interposed between said stopper and the other of said casing and said hollow cylinder of said supporting stand.

6. A Karman's vortex flow meter according to claim 5, wherein said displacement limiting means further includes
  a blind hole formed in said hollow cylinder, said blind hole having an inner diameter larger than an outer diameter of said stopper,
  said stopper being coupled to said casing and extending into said blind hole, and
  said elastic member being interposed between an inner peripheral surface of said blind hole and an outer peripheral surface of said stopper.

7. A Karman's vortex flow meter according to claim 5, wherein
  said displacement limiting means further includes a through-hole formed in said casing, said through-hole having an inner diameter larger than an outer diameter of said stopper,
  said stopper extending through said through-hole and being coupled to said hollow cylinder of said supporting stand, and
  said elastic member being interposed between an inner peripheral surface of said through-hole and an outer peripheral surface of said stopper.

8. A flow meter comprising:
  a supporting stand for mounting on a pipeline, said supporting stand including a hollow cylinder having at least a portion of a flow detector therein;
  a casing for containing an amplifier to amplify signals from the flow detector, the casing being mounted on the hollow cylinder;
  a stopper for permitting limited movement between the casing and the supporting stand, the stopper being coupled to one of the supporting stand and the casing and extending into a hole in the other of the supporting stand and the casing; and
  an elastic member positioned in the hole between the stopper and the other of the supporting stand and the casing so that the stopper and the other of the supporting stand and the casing are out of direct contact.

9. The flow meter of claim 8, wherein the stopper is coupled to the casing and the hole is a blind hole formed in the supporting stand.

10. The flow meter of claim 9, wherein the elastic member is a thin cylinder fitted on the stopper.

11. The flow meter of claim 9, wherein the elastic member is an O-ring received in a groove formed on the stopper.

12. The flow meter of claim 9, wherein the elastic member is an O-ring received in a groove formed in a portion of the supporting stand surrounding the hole.

13. The flow meter of claim 9, further comprising dampeners between the hollow cylinder of the supporting stand and the casing so that the supporting stand casing are out of direct contact.

14. The flow meter of claim 9, wherein the stopper is coupled to the supporting stand and the hole is a through hole in the casing.

15. The flow meter of claim 9, further comprising an auxiliary stopper coupled to the one of the supporting stand and the casing and extending into an auxiliary hole in the other of the supporting stand and the casing, and an auxiliary elastic member positioned in the auxiliary hole between the auxiliary stopper and the other of the supporting stand and the casing so that the auxiliary stopper and the other of the supporting stand and the casing are out of direct contact.

* * * * *